3,467,620
SYNTHETIC RUBBER COMPOSITIONS
Robert J. Orr, Leo Breitman, and Ernest J. Buckler, Sarnia, Ontario, Canada, assignors to Polymer Corporation Limited, Sarnia, Ontario, Canada, a corporation
No Drawing. Filed May 13, 1965, Ser. No. 455,625
Claims priority, application Canada, May 26, 1964, 903,584
Int. Cl. C08d 3/02, 13/02
U.S. Cl. 260—41.5      20 Claims

ABSTRACT OF THE DISCLOSURE

A rubbery copolymer of 50–85 mole percent of 2-alkyl butadiene such as isoprene and 50–15 mole percent of a non-ionizable polar comonomer such as acrylonitrile is vulcanized in the absence of carbon black or other reinforcing agents to produce an elastic composition having a tensile strength of at least 65 kg./cm.$^2$. Sulfur-vulcanized gum compositions show a tensile strength of at least 130 kg./cm.$^2$ and ultimate elongation of at least 500. The composition is suitable for the preparation of rubber-elastic films and rubber threads.

---

This invention relates in general to synthetic rubber compositions and in particular, it is concerned with elastic nonreinforced compositions containing a rubbery copolymer of isoprene and a copolymerizable monomer having a positive Alfrey-Price copolymerization parameter $e$ such as acrylonitrile.

Synthetic polymers of conjugated diolefins produced in the presence of free radical type catalysts are characterized by poor tensile strength and low extendability, and depend for strength on reinforcing agents such as carbon black. For example, emulsion copolymers of butadiene and styrene, or isoprene and styrene, when vulcanized in the absence of reinforcing agents, show a tensile strength of about 14 to 42 kg./cm.$^2$. When vulcanized in the presence of about 50 parts per 100 parts of polymer of carbon black, the same copolylmers give a tensile strength ranging from 100 to 280 kg./cm.$^2$. Styrene-butadiene copolymers, also known in the trade as SBR polymers, have found a wide use in many technically important applications, where carbon blacks or other reinforcing agents are not objectionable. However, in applications in which strong gum compositions are required SBR is practically useless and natural rubber is almost exclusively used. The tensile strength of natural rubber gums which is about 5 to 10 times higher than that of SBR gum compositions is related to the orientation of molecules on stretching and formation of spatially ordered structures known as crystallites. The formation of crystallites is believed to be possible only when the polymer chain molecules are regularly built, that is, when essentially all monomer units are linked in the same steric configuration.

In contrast to natural rubber, synthetic rubbers such as produced by by polymerizing aliphatic conjugated diolefins in an aqueous dispersion in the presence of free radical type catalyst have the monomeric units of the conjugated diolefins linked in all possible configurations: 1,2; 3,4; cis-1,4; trans-1,4; head-to-tail and head-to-head to form a highly irregular polymeric chain in which hardly any two segments of the chain are alike. It is not surprising that polymers having such irregularly built molecules are incapable of forming crystallites or otherwise developing the ordered structure necessary for good gum tensile strength.

Various methods have been proposed for strengthening gum composition of synthetic rubbers of the SBR or NBR (acrylonitrile-butadiene rubber) types. For example, butadiene and a comonomer have been copolymerized in the presence of a copolymerizable unsaturated carboxylic acid to produce polymers containing a small amount of carboxylic groups randomly distributed along the polymer chains. These groups are capable of reacting with multivalent metal compound such as zinc oxide and forming ionic crosslinks between the chains. A vulcanized composition of a synthetic polymer containing ionic crosslinks in addition to sulfur crosslinks has shown good strength in the absence of reinforcing agents. However, this method of strengthening gum compositions has a serious disadvantage in that carboxylic polymers easily gel and scorch so that the processing in rubber processing equipment is rather difficult. It has also been proposed that rubbery polymers of conjugated diolefins could be blended with compatible resinous polymers in proportions such as necessary for a desired degree of reinforcement. Such blends, however, show a reduced flexibility and extendability or an increased plastic flow at elevated temperatures. They can be used only in applications where rubber elasticity is not essential.

The object of this invention is to overcome the disadvantages of the prior art compositions and to provide a processable nonreinforced composition of a rubbery copolymer of a 2-alkyl butadiene-1,3. A further object of the invention is to provide elastic non-reinforced compositions of a rubbery copolymer of a 2-alkyl butadiene-1,3. And yet another object of the invention is to provide shaped and vulcanized non-reinforced compositions of a rubbery copolymer of a 2-alkyl butadiene-1,3. And yet another object of the invention is to provide shaped and vulcanized non-reinforced compositions of a rubbery copolymer of a 2-alkyl butadiene-1,3.

The objects of the invention have been achieved in the production of an elastic composition comprising a vulcanized mixture containing a rubbery copolymer of a major proportion of a 2-alkyl butadiene-1,3 and a minor proportion of at least one non-ionizable polar comonomer having an Alfrey-Price copolymerization parameter $e$ of at least 0.4, said mixture being free of reinforcing filler. In one of its specific aspects, the objects of the invention have been achieved in the process of admixing a rubbery copolymer of isoprene and acrylonitrile, said copolymer containing 15 to 50 mole percent of acrylonitrile, and compounding ingredients comprising 1 to 10 parts of zinc oxide, between 0.25 and 5 parts of sulfur and, if desired, a minor proportion of non-reinforcing fillers, all parts being parts by weight per 100 parts of the copolymer, shaping the compounded mixture and vulcanizing the shaped mixture.

We have discovered that a copolymer of a major proportion of 2-alkyl butadiene-1,3 and a minor proportion of a non-ionizable polar monomer having an Alfrey-Price copolymerization parameter $e$ of at least +0.4, can be compounded in the absence of reinforcing agents to produce vulcanizable compounds having an unexpectedly high strength. We have also found that the rubbery copolymer of isoprene and acrylonitrile has a more regular chain configuration than a homopolymer of isoprene polymerized under the same conditions or a corresponding copolymer of butadiene-1,3. For example, an isoprene/acrylonitrile copolymer containing about 40 mole percent acrylonitrile has essentially all isoprene units linked in the trans-1,4 configuration. The copolymer has been found to stretch easily at low elongation, but to stiffen at elongation of above 400% and form fiber-like molecular structures detectable by X-ray diffraction methods. The discovery of the stress induced orientation of the copolymer molecules and high physical strength of vulcanized non-reinforced compositions led us to the preparation of films and thread-like shaped gum compositions. We have been further led to the preparation of compositions containing a high proportion of inexpensive non-reinforcing lightly coloured fillers which have good physical properties.

The rubbery copolymer which can be used in accordance with the invention is a copolymer of a major proportion of 2-alkyl butadiene-1,3 and a minor proportion of at least one copolymerizable polar comonomer having a positive Alfrey-Price copolymerization parameter $e$. The alkyl substituent in the 2-alkyl butadiene-1,3 may be any alkyl radical containing 1 to 5 carbon atoms such as methyl, ethyl, isopropyl, butyl, amyl and representative examples of the 2-alkyl butadiene-1,3 are isoprene, 2-ethyl butadiene-1,3, 2-isopropyl butadiene-1,3 and 2-amyl butadiene-1,3. The 2-alkyl butadiene-1,3 may also be substituted at the third carbon atom, as for example in 2,3-dimethyl butadiene-1,3. However, it is preferred to use butadiene-1,3 having at the second carbon atom an alkyl substituent containing 1–2 carbon atoms and best results are obtained with 2-methyl butadiene-1,3 which is known as isoprene. The 2-alkyl butadiene-1,3 can be replaced in part by an unsubstituted alka-diene-1,3 such as butadiene-1,3 or piperylene. However, it is preferred that the 2-alkyl butadiene-1,3 constitutes more than 70% by weight of the mixture of the alkadienes. The comonomer or comonomers present in the copolymer are non-ionizable copolymerizable polar compounds having a positive Alfrey-Price copolymerization parameter $e$. The parameter $e$ is one of two parameters $Q$ and $e$ by which individual monomers are characterized and which account satisfactorily for the behaviour in copolymerization. The parameter $Q$ describes general monomer reactivity, while the parameter $e$ takes account of polar factors influencing copolymerization. The parameters, originally calculated by T. Alfrey and C. C. Price in Journal of Polymer Science, volume 2 (1947), pages 101 to 106, have been updated by Lewis J. Young and are presented in Table III of the article in Journal of Polymer Science, volume 54 (1961), pages 411 to 455. The table in which many monomers are listed in the order of the increasing $e$ value forms a basis for the definition of comonomers used in the copolymer in accordance with the invention. It is preferred to use comonomers having parameter $e$ equal to, or greater than, 0.4 and for best results those having $e$ of at least 0.8 are the most preferred. The comonomers which are readily copolymerizable with 2-alkyl butadiene-1,3 are preferably used. They are characterized by a $Q$ value of at least 0.1, and preferably higher than 0.4. The comonomers are also non-ionizable, that is, they do not dissociate into ions, when dispersed in a medium having a high dielectric constant. Therefore, ionizable monomers having a positive $e$ value such as acrylic acid, methacrylic acid, sorbic acid, or acid ester of unsaturated dicarboxylic acids such as ethyl acid maleate are not included in the scope of this invention. Representative examples of non-ionizable readily copolymerizable comonomers are ethylenically unsaturated cyanides such as acrylonitrile, vinylidene cyanide, methacrylonitrile, alpha acetoxy acrylonitrile; ethylenically unsaturated amides such as acrylamide, methacrylamide; esters of ethylenically unsaturated acids such as butyl acrylate, methyl acrylate, decyl methacrylate, betachloroethyl acrylate, methyl methacrylate, methyl thioacrylate; unsaturated ketones and aldehydes such as methyl vinyl ketone, methyl isopropenyl ketone, acrolein; unsaturated alcohols and halides such as 2-chloroallyl alcohol, 2-chloroallyl chloride, vinylidene chloride. Ethylenically unsaturated compounds with polar substituents other than those listed above such as sulfo, nitro or cyclic amino groups can also be used, for example, para or meta isomer of nitrostyrene, 4-vinyl pyrimidine. However, the preferred comonomers are nitriles, amides and alkyl esters of unsaturated monocarboxylic acids such as acrylic acid, methacrylic acid and the most preferred are those having an $e$ value of at least 0.8. Best results are obtained with acrylonitrile which has a high $e$ value of 1.20 as well as a high $Q$ value of 0.60.

One or more polar comonomers may be copolymerized with 2-alkyl butadiene-1,3 to produce copolymers which can be used in accordance with the invention. The sum of the moles of the comonomers present in the copolymer must not be greater than the number of moles of the alkyl butadiene-1,3. If any special effects are desired, small amounts of other copolymerizable monomers such as styrene, vinyl pyridine, vinyl chloride may also be used provided the resulting copolymer retains its rubbery character. The proportion of the 2-alkyl butadiene-1,3 to the polar comonomer may be expressed either on a weight basis as is usually done in the synthetic rubber industry or a molar basis which is preferred in this case since the molar proportion of a comonomer or comonomers rather than the weight proportion determines the properties of the copolymer. The molar proportion of 2-alkyl butadiene-1,3 to the sum of polar comonomers may vary between 85/15 and 50/50, although it is preferred to use copolymers having the molar proportion of 80/20 to 55/45. The copolymers containing more than 50 mole percent of polar comonomers are plastic-like and do not reversibly retract to the original shape after the release of stress. The copolymers containing less than 15 mole percent of the polar comonomer are similar to unsubstituted butadiene-1,3 copolymers in that they do not produce gum compositions having a high tensile strength.

The copolymers suitable for use in compositions of the present invention are produced by polymerizing in the presence of free radical type catalysts. Conventional catalysts may be used such as potassium persulfate, diazothioether or a Redox system consisting of an organic peroxide and a reducing complex salt of ferrous iron. The latter system is especially effective in an aqueous emulsion system at low temperature of less than 25° C., e.g. 0 to 25° C., while the other catalysts are usually employed at a temperautre above 25° C., and preferably below 70° C. Various techniques may be employed in the polymerization. The monomers may be copolymerized in bulk, solution or suspension, although it is preferred to carry out the copolymerization reaction in an aqueous emulsion system. In the emulsion system, any type of emulsifier may be used as long as it sustains the reaction; it may be an anion-active emulsifier such as a fatty acid soap or a sodium salt of an alkylaryl sulfonic acid, a non-ionic emulsifier of the ethoxylated phenol type or a cation-active emulsifier such as ammonium salt of a fatty amine with an organic or inorganic acid. The anion-active emulsifiers are preferred when the copolymer is to be used in latex form. They produce a latex having an alkaline reaction of pH between 7 and 12 which can be easily compounded with vulcanizing agents and other compounding ingredients using procedures developed for natural latex or other commercially available rubber latices.

The copolymers which are used according to the invention are high molecular weight and substantially gel-free rubbers. It is customary in the rubber industry to express the molecular weight of rubbery polymers in terms of Mooney viscosity which is determined according to ASTM D1646–61 procedure. The Mooney viscosity of the copolymer may vary within wide limits from 10 to above 150. The upper Mooney limit is not critical but it is preferred for ease of compounding that the Mooney viscosity is not over 140. The lower limit of Mooney viscosity is more critical and satisfactory gum compositions of the present invention can be prepared from copolymers having not less than 10 Mooney viscosity. For best rubber elastic properties, however, a Mooney viscosity of at least 20 is preferred.

For the preparation of the composition of the present the 2-alkyl butadiene-1,3 copolymer may be used in a solid form as a solution in a volatile solvent or as a dispersion in an aqueous emulsion. The method of compounding depends on the form in which the copolymer is present. In the case of solid polymer, all compounding ingredients are added in a pure or solid form and mechanically worked into the solid mix to achieve good dispersion. This is usually done in an open rubber mill or an internal mixer. In the case of a dispersion of the copolymer, that is, a latex, compounding ingredients are added in the form of compatible emulsions or dispersions or in a solid or pure form, if they do not effect the latex stability, and mixed in by vigorously agitating the latex compound. Similar procedure may also be used in case of a polymer solution. The compositions made from polymer solutions or dispersions are devolatilized under controlled conditions of temperature and rate of devolatilization to produce compositions essentially similar to those made from solid copolymers.

The rubbery copolymer of 2-alkyl butadiene-1,3 and a polar monomer as defined above may be used in the form as recovered from the polymerization system. It is not essential to add extraneous materials to produce a composition having desired properties. The properties may be achieved by subjecting the copolymer to a treatment whereby the essentially linear polymeric chains are crosslinked to a degree sufficient to assure a good retention of shape and dimensions of shaped compositions under different conditions of storage and use. To achieve such crosslinking the copolymer may be, for example, irradiated with ionizing radiation such as gamma-rays or X-rays or heat treated in the presence of air. However, for better physical properties of the composition it is preferred to add and thoroughly mix into the copolymer compounding ingredients such as vulcanization agents, antioxidants, plasticizers, non-reinforcing fillers. Useful compositions can be produced with crosslinking systems such as free radical producing compounds of the dicumyl peroxide type, but sulfur vulcanization systems are preferred. Sulfur may be added in an amount varying between 0.25 and 5.0 parts per 100 parts of the copolymer, although best results are obtained with 2.5 parts or less. In order to speed the vulcanization reaction at usual temperatures or to allow the vulcanization reaction to take place at a low temperature, an accelerator is used along with the sulfur. The chemical nature of the accelerator is not critical and any commercially available type may be used, for example, dithiocarbamate, guanidine, thiazole or a thiuram. The amount may vary within wide limits depending on the activity of the accelerator, the conditions used for vulcanization and the properties desired in the final product. Satisfactory results are obtained with 0.1–2.5 parts of accelerator per 100 parts of the copolymer.

The addition of a non-reinforcing filler may be desirable in certain specific embodiments of the invention. The filler may be added to decrease tackiness of the copolymer, promote mixing with vulcanization agents, facilitate shaping, and generally improve processability in the conventional rubber processing equipment. It may also improve the appearance of the composition as well as reduce its cost without essentially changing the physical properties.

The non-reinforcing filler may be a naturally occurring or commercially produced inorganic or organic material in the form of fine powder or fibers. Of the inorganic fillers the following can be used: asbestos; bentonite; diatomaceous earth; dolomite; lithopone; hydrate; oxide or silicate of aluminum; carbonate, silicate or sulfate of barium or calcium; magnesium oxide or silicate; silica or titanium dioxide, of which aluminum silicate, barium sulfate, calcium carbonate and magnesium silicate are preferred. Among the organic fillers that can be used are the following: starch, wood flour, cork, cellulose, rubber dust, phenolic resins. The filler may be used in a quantity varying between 0 and 200 parts per 100 parts of the copolymer. The preferred amount in gum compositions is between 5 and 20 parts. However, if it is desired to reduce the cost of the composition, the filler may be added in an amount between about 50 and 150 parts per 100 parts of rubber to produce a highly filled composition. It has been established that the composition of the present invention has a higher tolerance for non-reinforcing fillers than the butadiene-acrylonitrile rubber at equivalent physical properties of tensile strength and elongation. It has also been established that highly filled composition of this invention has a better ageing resistance than a highly filled polychloroprene composition having similar physical properties. Zinc oxide occupies a special position among the fillers, since it participates in the sulfur vulcanization reaction. It is preferred to use 1–10 parts of zinc oxide and satisfactory results are obtained with about 1–5 parts per 100 parts of the copolymer. However, loadings of more than 10 parts may be used, if desired, instead of, or in addition to, the fillers listed hereabove.

The composition of the invention may also contain an antioxidant in an amount of about 1 part per 100 parts of the copolymer. Any conventional antioxidant may be used, for example an amine type such as phenyl beta naphthylamine or a phenolic type such as ditertiary amyl hydroquinone. A plasticizer may be added, if desired. Stearic acid is preferably used, for it also regulates the vulcanization reaction, but other types of plasticizers and softeners can be used instead of or in addition to stearic acid.

In the case of compositions prepared from a dispersion of the copolymer it may be necessary to include ingredients which are not used in dry mixed composition. For instance, to improve the colloidal stability of the dispersion during compounding, a colloidal stabilizer is added. The stabilizer may be selected from a number of different chemical substances of which ammonia, ammonium caseinate, fatty acid soap or synthetic emulsifiers are the examples. The viscosity of the dispersion is adjusted to a required level by the addition of thickening agents which are water soluble synthetic or natural polymers such as sodium polyacrylate, alginate, cellulose derivatives. It may also be desired to add a heat sensitizing agent if the dispersion is to be gelled by heating to produce a semisolid, also called wet gel, composition.

The composition of the invention is shaped using conventional methods of shaping rubbery materials. When in a solid but deformable form, it may be calendered, extruded or moulded to form slabs, films, coatings, threads or otherwise shaped materials or articles. When in a relatively free flowing form of a dispersion in a solvent or nonsolvent, the composition may be also shaped by casting, dipping or spreading to form films, threads, coatings and, in general, materials and goods of relatively fine thickness. The composition which had been shaped to a desired form is next subjected to a curing treatment whereby it is transformed to an elastic state. The treated composition is rubbery, that is, it may be easily deformed, when a stress is applied, but returns ot its original shape, when the stress is removed. Conventional methods may be used for curing the composition. It may be irradiated with an ionizing radiation or it may be heated at a temperature of above 100° C. in the presence of oxygen or free radical forming compounds. However, for best results it is preferred to vulcanize the composition containing sulfur and an accelerator. The temperature of vulcanization depends on the type of the vulcanization system used and may vary from room temperature to about 200° C., although the preferred range for vulcanizing is between 120 and 170° C.

The resulting vulcanized compositions are characterized by a stress-strain behaviour which is very similar to natural rubber gum compositions. They show a tensile strength of at least 65 kg./cm.$^2$ and preferably at least 130 kg./cm.$^2$ and an elongation at least 500%. Their stress values at low elongations are low. Therefore, they can be used in applications in which natural rubber has been used. The compositions of the invention, however, possess an additional advantage over natural rubber in that they are oil resistant and can be used, where natural rubber is useless. For instance, they can be used as rubber thread in elastic fabrics which may be dry cleaned, or in manufacturing rubber articles such as gloves resistant to hydrocarbon oils and greases.

The invention is illustrated in detail in the following examples.

Example I

A solid copolymer of isoprene and acrylonitrile having a raw polymer Mooney viscosity (RPM/L4–100° C.) of 66.5 and containing 31% by weight (36.5 mole percent) of acrylonitrile was compounded on a 6" x 12" rubber mill using the following recipe in parts by weight:

| | |
|---|---|
| Copolymer | 100 |
| 2,5-di-tertiary amyl hydroquinone | 1 |
| Zinc oxide | 5 |
| Stearic acid | 1 |
| Sulfur | 2.5 |
| Benzothiazyl disulfide | 0.7 |

The copolymer was prepared in a 25 gallon glass-lined agitated vessel by polymerizing at 13° C. a mixture of 65 parts isoprene and 35 parts acrylonitrile emulsified in 254 parts of an aqueous solution containing 1.2% of a polymerized alkyl naphthalene sodium sulfonate dispersing agent, 0.2% of an alkyl benzene sodium sulfonate and 0.06% of trisodium phosphate. The polymerization reaction was initiated by a Redox system containing 0.2 part of diisopropyl benzene monohydroperoxide and 0.13 part of a ferrous sulfoxylate complex and carried out to a solids level of 26.2% which corresponds to a monomer conversion of 90%. After stopping the reaction with potassium dimethyl dithiocarbamate, the resulting latex was steam stripped to remove the unreacted monomer mixture, stabilized with an alkylated bis-phenol antioxidant and glue-alum coagulated. The product in the form of a porous crumb was then dried at 80° C. in a forced air drying oven.

The polymer crumb was then sheeted in a mill at a tight mill setting, then banded on a roll at a wide mill setting. The compounding ingredients, as listed in the recipe, were next added and mixed at a temperature of 55–95° C. and the mixture was again sheeted. After a period of rest at room temperature, the sheeted material was placed in a 150 mm. x 150 mm. x 1.9 mm. mould and heated under pressure at 145° C. for 50 minutes to vulcanize the compound. A dumbbell sample was cut from the vulcanized sheet and tested for stress-strain properties in a Scott tester. The sample showed a tensile strength of 167.5 kg./cm.$^2$ at an elongation of 760%. A similar dumbbell sample cut from the sheet vulcanized for 75 minutes at 145° C. in the presence of 0.5 part benzothiazyl disulfide showed a tensile strength of 159 kg./cm.$^2$ at an elongation of 830%.

A copolymer of butadiene and acrylonitrile containing 34% acrylonitrile and having a Mooney viscosity of 83 when compound and vulcanized under similar conditions, showed a maximum tensile of 23 kg./cm.$^2$ at an elongation of 390%.

Example II 100 parts of the copolymer of Example I was compounded in a rubber mill with 2 parts of dicumyl peroxide and 1 part of ditertiary amyl hydroquinone. The compound was cured at 145° C. for 50 minutes and then tested for stress-strain properties using the Scott tester. It showed a tensile strength of 47 kg./cm.$^2$ at an elongation of 1080%. The 300% modulus was only 8.5 kg./cm.$^2$. A sample cured for 100 minutes showed a tensile increased to 65 kg./cm.$^2$. The elongation and 300% modulus were essentially unchanged.

Example III

A solid copolymer of 65/35 isoprene/acrylonitrile having a Mooney viscosity (RPM/L4′–100° C.) of 80 was compounded and shaped as shown in Example I using the described recipe except that the amount of benzothiazyl disulfide was increased to 1.2 parts. The Mooney viscosity of the compounded material (CPM/L4–100° C.) was 44 indicating that the processability of the compound was good. The scorch time at 145° C. measured in the Mooney viscometer was 17 minutes, that is, sufficiently long to ensure safe handling during mixing and shaping. The sheet vulcanized at 145° C. for 35 minutes showed a tensile of 153 kg./cm.$^2$, an elongation of 765% and a modulus at 300%, elongation of 14.5 kg./cm.$^2$. The hardness measured by means of an A–2 Shore durometer was 39. Permanent tensile set was measured on a 38 mm. x 2.5 mm. x 1.9 mm. sample cut from the moulded sheet. The sample was stretched to double its original length and held in stretched condition for 10 minutes. The stress was then released and the sample relaxed for 10 minutes showed a permanent set of 1.5%.

Example IV

A copolymer of 65/35 isoprene/acrylonitrile containing 31% acrylonitrile and having a Mooney viscosity (RPM/L4–100° C.) of 70 was compounded using the procedure shown in Example I except that in the compounding recipe the amount of benzothiazyl disulfide was increased to 1.5 parts, and a variable amount of a white filler, barium sulfate sold under the trade name of barytes or hydrated aluminum silicate available under the trademark "Dixie Clay," was added. The compounded material was pressure moulded to a 63.4 mm. x 25.4 mm. x 0.63 mm. sheet and vulcanized at 145° C. for 50 minutes. Dumbbell samples were cut from the sheet and subjected to stress-strain testing in a Micro Scott tester. The results are presented in Table I.

TABLE I

| Compound Number | 1 | 2 | 3 | 4 | 5 |
|---|---|---|---|---|---|
| Filler | "Barytes"[1] | | "Dixie Clay"[2] | | |
| Amount of Filler, parts/100 parts of polymer | 5 | 10 | 5 | 10 | 15 |
| CPM/L4–100° C | 52 | 52 | 54 | 54 | 56 |
| Cured 50 minutes at 145° C.: | | | | | |
| Tensile Strength (kg./cm.$^2$) | 225 | 211 | 241 | 222.5 | 200 |
| Elongation at break (percent) | 610 | 610 | 700 | 670 | 630 |
| Modulus (kg./cm.$^2$) at— | | | | | |
| 300% elongation | 21.1 | 19.0 | 21.1 | 26.8 | 38.0 |
| 500% elongation | 77.8 | 70.4 | 57.8 | 76.9 | 98.9 |
| 600% elongation | 213 | 190 | 106 | 131 | 166 |
| Shore A–2 hardness | 43 | 43 | 43 | 41 | 44 |

[1] "Barytes" trade name for natural barium sulfate.
[2] "Dixie Clay" trademark for hydrated aluminum silicate.

The compounds were not as tacky as the pure gum compounds of preceding examples and handled satisfactorily in the rubber mill. When pressure moulded they reproducibly produced smooth sheets free of any defects in the surface or in the body of the sheet. The data presented in Table I indicate that barium sulfate and aluminum silicate essentially act as non-reinforcing fillers and slightly depress the tensile strength of gum compounds. Aluminum silicate of the "Dixie Clay" type appears to increase moduli at intermediate elongations of 300–600%. The data of the table also indicate that moduli at low elongations are relatively low and increase markedly at elongations above 500%.

A 50 mm. long thread-like specimen having the cross section of a 3 mm. x 3 mm. square was cut from a press-moulded sheet prepared from compound No. 3 and vulcanized at 145° C. for 75 minutes. The specimen was stretched by hand to about 900% elongation at which a definite stiffening was felt, and examined by X-ray diffraction in the stretched condition. A diffraction pattern which was recorded on a film showed two equatorial diffraction spots. A specimen of the same dimensions prepared from the unvulcanized compound No. 3 also showed two diffraction spots which were rather diffuse so that the exact location of the maxima was difficult to determine. Reflections in non-equatorial position were not detected. The $d$ spacings between reflecting sites of the oriented fibers were calculated from the distance between the diffraction spots on the film and the distance between the specimen and the film. They were found to be 5.2±0.2 Angstrom. The diffraction pattern indicated that the isoprene-acrylonitrile copolymer formed a two dimensional "crystal" which was laterally ordered but showed no longitudinal order in the direction of stress. The above X-ray fiber diagram was detected at elongation of 400% and above. At 300% elongation and below the compound was amorphous. An undercured copolymer of butadiene-acrylonitrile containing about 34% acrylonitrile did not show fiber orientation at 750% elongation.

Example V

Two copolymers of isoprene and acrylonitrile having different acrylonitrile content were compounded according to the procedure described in Example I using the following recipe in parts by weight:

| | |
|---|---|
| Polymer | 100 |
| Barium sulfate | 5 |
| 2,5-di-tertiary amyl hydroquinone | 1 |
| Zinc oxide | 5 |
| Stearic acid | 1 |
| Sulfur | 2.5 |
| Benzothiazyl disulfide | 1.5 |

The physical properties of the compounds are shown in Table II.

TABLE II

| Compound Number | 1 | 2 |
|---|---|---|
| Acrylonitrile content: | | |
| Percent by weight | 27 | 37 |
| Mole percent | 32 | 43 |
| RPM/L4–100° C | 92 | 135 |
| CPM/L4–100° C | (¹) | 68 |
| Cure Time at 145° C. (mins.) | 50 | 75 |
| Tensile Strength (kg./cm.²) | 152 | 279 |
| Elongation (percent) | 670 | 600 |
| Modulus (kg./cm.²) at— | | |
| 300% elongation | 18.7 | 26.8 |
| 500% elongation | 39.2 | 93.7 |
| 600% elongation | 79.5 | 279 |
| Shore A–2 hardness | (¹) | 48 |

¹ Not tested.

The results shown in Table II indicate that the strength of vulcanized non-reinforced compounds of isoprene-acrylonitrile copolymers depends on the acrylonitrile content in the polymer. Compound No. 2 showed a tensile strength approximately 80% higher than compound No. 1 which contained about 10% less acrylonitrile.

Example VI

A latex of an isoprene-acrylonitrile copolymer containing 31% acrylonitrile and having a Mooney viscosity (RPM/L4–100° C.) of 30 was prepared in a polymerization system as described in Example I. The latex was steam stripped to remove unreacted monomers and then compounded using the following recipe in which all ingredients are in parts by weight of dry or active material:

| | |
|---|---|
| Latex | 100 |
| Alkylated bis-phenol antioxidant | 1 |
| Sulfur | 1 |
| Zinc diethyl dithiocarbamate | 1 |
| Zinc oxide | 3 |
| Zinc salt of 2-mercapto-benzothiazole | 0.5 |
| Ammonium caseinate | 4.0 |
| Ammonium hydroxide | 1.0 |

The compounded latex was evenly spread on a smooth poly (tetrafluoroethylene) slab and permitted to dry slowly in an atmosphere maintained at 25° C. and 50% humidity. The air dried latex sheet having a thickness of 0.4 mm. was then cured at 121° C. The stress-strain properties of uncured and cured sheets were determined by means of an Instron tester and the results are shown in Table III.

TABLE III

| Cure Times (minutes) | 0 | 5 | 15 |
|---|---|---|---|
| Tensile Strength (kg./cm.²) | 26.8 | 147.5 | 147 |
| Elongation (percent) | 1,490 | 845 | 660 |
| Modulus at 300% elongation (kg./cm.²) | 10.9 | 21.8 | 30.7 |

The results indicate that the latex gum composition containing isoprene/acrylonitrile copolymer is capable of developing high tensile strength on curing. The uncured film also showed a strength satisfactory for handling films in the uncured state.

Example VII

A latex of an isoprene copolymer containing 37% by weight (43 mole percent acrylonitrile and having a Mooney viscosity (RPM/L4–100° C.) of 135 was used for the preparation of latex films. The latex of 26% solids content was stabilized with 1 part per 100 parts latex solids of polyalkyl polyphenol stabilizer.

One sample of the latex was mixed with 15% aqueous solutions of ammonium caseinate and sodium polyacrylate. The solutions were added in amounts to give 2.5 parts on dry weight basis of the ammonium caseinate and 1.3 dry parts of sodium polyacrylate available on the market under the trademark "Polyresin 44" per 100 parts of latex solids. The viscosity of the latex mix determined in a Brookfiield LVT viscometer at 30 r.p.m. and 25° C. was 16 poise and, when aged for 24 hours at room temperature, 26.6 poise.

Second sample of the latex was also mixed with ammonium caseinate and sodium polyacrylate solutions, as was the first sample, and then compounded with the following vulcanizing agents: 0.5 part of zinc mercaptobenzothiazole, 1.0 part of zinc diethyl dithiocarbamate, 1.0 part of sulfur and 3.0 parts of zinc oxide. All parts are on the dry weight basis per 100 parts of latex solids.

Air dried films and heat treated films of these two latex compounds were prepared in a manner as described in Example VI. Wet gel films were prepared by dipping a polytetrafluoroethylene plate first into one of the latex compounds followed by dipping into a coagulant solution. Two coagulants were used, a 20% solution of calcium nitrate in a 1:1 mixture of ethanol and water and a 10% solution of glacial acetic acid in water. The wet gel films were then stripped off the plate and tested for tensile strength. The results for wet gel films are not accurate since it was difficult to measure the thickness of soft films. Stress-strain data for the latex films are presented in Table IV.

TABLE IV

| Latex Compound Number | 1 | 2 |
|---|---|---|
| Vulcanization Agents | Absent | Present |
| Tensile Strength (kg./cm.²): | | |
| Wet film gelled by Ca(NO₃)₂ | About 5 | 7–9 |
| Wet film gelled by CH₃COOH | About 5 | 7–11 |
| Tensile Strength (kg./cm.²)/Elongation (percent)/300% Modulus (kg./cm.²): | | |
| Air dried film* | 19/1,400/** | 22/1,300/** |
| Heated 5 minutes at 121° C | 56/1,070/8.5 | 200/815/13 |
| Heated 10 minutes at 121° C | 92/955/10 | 222/650/19 |
| Heated 30 minutes at 121° C | 154/1,065/12.5 | 306/660/25 |

*Dried 24 hrs. at 25° C., continued about 4% moisture.
**Not measured.

The results indicate that wet gel films have a fairly good tensile strength such as required in the production of dipped goods. The air dried film containing vulcanization agents has good cohesiveness and develops on curing a very satisfactory tensile strength of 306 kg./cm.² at 660% elongation. The 300% modulus is low indicating that the film is easily extendible. An interesting observation was also made that the air dried film prepared from latex compound No. 1 develops on heating a high tensile strength of 154 kg./cm.² although no vulcanizing agents are present.

Example VIII

To 100 parts of an isoprene-acrylonitrile copolymer having an acrylonitrile content of 31% and a Mooney viscosity of 109 was added on a rubber mill 125 parts of dry limestone having an average particle size of 4 microns. The mix was next componded with the ingredients of the vulcanization recipe shown in Example I except for the amount of benzothiazyl disulfide which was increased to 1.5 parts. The compound was moulded to a 1.9 mm. thick sheet, vulcanized at 145° C. for 35 minutes and then tested as described in Example I. Stress-strain tests were also performed on the vulcanized composition which has been aged 24 hours at 100° C. in ASTM oil #3. Also compounded and vulcanized by the same procedure were a polychloroprene rubber and a butadiene-acrylonitrile copolymer containing 34% acrylonitrile. These were used as controls for the isoprene-acrylonitrile copolymer. The test data are presented in Table V.

TABLE V

| | Rubber type | | |
|---|---|---|---|
| | Isoprene/acrylonitrile | Butadiene/acrylonitrile | Chloroprene |
| Tensile Strength (kg./cm.$^2$) | 89 | 29 | 71 |
| Elongation (percent) | 715 | 680 | 870 |
| 300% Modulus (kg./cm.$^2$) | 12.7 | 9.3 | 14.1 |
| Aged Tensile Strength | 93 | 19.5 | 42 |
| Aged Elongation (percent) | 740 | 200 | 1,100 |
| Aged 300% Modulus (kg./cm.$^2$) | 8.5 | 8.5 | 3.2 |

The table shows that the isoprene/acrylonitrile copolymer composition is superior to the butadiene/acrylonitrile in tensile strength and better than polychloroprene in the resistance to hot oil ageing.

Example IX

Two copolymers of isoprene were compounded using the recipe of Example V except that the amount of benzothiazyl disulfide was increased to 1.5 parts.

One copolymer was prepared by polymerizing a 50/50 mixture of isoprene (I) and methyl methacrylate (MMA) in an aqueous emulsion of potassium fatty acid soap. The polymerization reaction was initiated at 13° C. by a Redox catalyst system consisting of diisopropyl benzene monohydroperoxide and ferrous sulfoxylate complex and carried out isothermally to 70% conversion. The Mooney viscosity (ML-4 at 100° C.) of the copolymer was 78.

The second copolymer was prepared by polymerizing at 50° C. a 65/35 mixture by weight of isoprene (I) and methacrylonitrile (MACN in a fatty acid soap emulsion using a potassium persulfate catalyst. The Mooney viscosity (ML-4 at 100° C.) of the second copolymer was 55.

The compounds were milled at about 50° C. showing a good mill handling, than sheeted and vulcanized at 145° C. in a press mould. The vulcanized stocks were tested in the Scott tester for stress-strain properties and the results are shown in Table VI.

TABLE VI

| Compound | 1 | 2 |
|---|---|---|
| Copolymer Type | I-MMA | I-MACN |
| Tensile Strength (kg./cm.$^2$): | | |
| 50 minute cure | 81 | 88 |
| 100 minute cure | 108 | 142 |
| Elongation (percent): | | |
| 50 minute cure | 435 | 550 |
| 100 minute cure | 470 | 650 |
| 300% Modulus (kg./cm.$^2$): | | |
| 50 minute cure | 23.3 | 30.6 |
| 100 minute cure | 24.8 | 29.9 |

The non-reinforced compounds 1 and 2 showed good tensile strength and high elongation.

Example X

A series of three terpolymers was made in which, in addition to isoprene and acrylonitrile, a third monomer such as styrene, butadiene and piperylene was copolymerized. The terpolymers were prepared at 13° C. in an emulsion polymerization system using a dodecyl benzene sodium sulfonate emulsifier and a Redox catalyst system consisting of diisopropyl benzene monohydroperoxide and ferrous sulfoxylate complex. They were each compounded using the compounding recipe of Example V, press-moulded and vulcanized at 145° C. for 50 minutes. The results are presented in Table VII.

TABLE VII

| Compound | 1 | 2 | 3 |
|---|---|---|---|
| Terpolymer | I-ACN-Sty | I-ACN-Bd | I-ACN-Piperylene |
| Ratio of monomers (by wt.) | 55-35-10 | 49-35-16 | 49-35-16 |
| Conversion (percent of monomers) | 85 | 76 | 85 |
| Mooney Viscosity (ML-4 at 100° C.) | 64 | 63 | 51 |
| Unaged: | | | |
| Tensile Strength (kg./cm.$^2$) | 207 | 146 | 142 |
| Elongation (percent) | 660 | 730 | 720 |
| 300% Modulus (kg./cm.$^2$) | 17.6 | 13.4 | 14.4 |
| Flex life (kcy./cm.) | ($^1$) | 10 | ($^1$) |
| Hardness (Shore A-2) | 43 | | ($^1$) |

$^1$ Not tested.

What is claimed is:

1. An elastic synthetic rubber composition comprising a vulcanized mixture comprising 100 parts of a rubbery copolymer of a 2-alkyl butadiene-1,3 containing 1–5 carbon atoms in the alkyl substituent and at least one nonionizable polar comonomer having Alfrey-Price copolymerization parameters "e" and "Q" of at least 0.4 and at least 0.1, respectively, and selected from the group consisting of nitriles, amides and alkyl esters of ethylenically unsaturated carboxylic acids, said butadiene and polar comonomer being in a molar proportion between 85/15 and 50/50, 1 to 10 parts of zinc oxide, and 0.25 to 5.0 parts of sulfur, said mixture being free of reinforcing filler.

2. The elastic composition according to claim 1 in which the parameter "e" is at least 0.8.

3. The elastic composition according to claim 1 in which the 2-alkyl butadiene-1,3 is isoprene.

4. The elastic composition according to claim 2 in which the polar comonomer is acrylonitrile.

5. An elastic composition which comprises a shaped and sulfur vulcanized mixture containing 100 parts of a rubbery copolymer of 50–85 mole percent of a 2-alkyl butadiene-1,3 containing 1–5 carbon atoms in the alkyl substituent and 50–15 mole percent of at least one readily copolymerizable ethylenically unsaturated nitrile having Alfrey-Price copolymerization parameters "e" and "Q" of at least 0.8 and higher than 0.4, respectively, 1–10 parts of zinc oxide, 0–200 parts of a non-reinforcing filler, said mixture being free of reinforcing filler and having a tensile strength of at least 65 kg./cm.$^2$.

6. The elastic composition according to claim 5 in which the polar comonomer is acrylonitrile.

7. The elastic composition according to claim 6 in which the 2-alkyl butadiene is isoprene and the non-reinforcing filler is present in an amount between 5 and 20 parts.

8. The elastic composition according to claim 7 in which the non-reinforcing filler is selected from the group consisting of aluminum silicate, barium sulfate, calicum carbonate and magnesium sulfate.

9. A process of producing an elastic composition which comprises shaping and vulcanizing a mixture comprising 100 parts of a rubbery copolymer of a 2-alkyl butadiene-1,3 containing 1–5 carbon atoms in the alkyl substituent and at least one nonionizable polar comonomer having Alfrey-Price copolymerization parameters "e" and "Q" of at least 0.8 and higher than 0.4, respectively, and selected from the group consisting of nitriles, amides and alkyl esters of ethylenically unsaturated carboxylic acids, said butadiene and polar comonomer being in a molar proportion between 85/15 and 50/50, 1 to 10 parts of zinc oxide, and 0.25 to 5 parts of sulfur, said mixture being free of reinforcing filler.

10. The process according to claim 9 in which the polar comonomer is acrylonitrile.

11. A process of producing an elastic composition having a tensile strength of at least 130 kg./cm.$^2$ and an ultimate elongation of at least 500 percent which comprises preparing a mixture containing 100 parts of a rubbery copolymer of 55–80 mole percent of isoprene and 45–20 mole percent of acrylonitrile, 1–10 parts of zinc oxide, 5–20 parts of a non-reinforcing filler, 0.25–5.0 parts of sulfur, and 0.1–2.5 parts of a vulcanization accelerator, said mixture being free of reinforcing filler, shaping and vulcanizing the mixture.

12. A process of producing an oil-resistant elastic film having a tensile strength of at least 130 kg./cm.$^2$ and an ultimate elongation of at least 500 percent which process comprises preparing a vulcanizable mixture comprisinf an aqueous dispersion of a rubbery copolymer of 55–80 mole percent of isoprene and 45–20 mole percent of acrylonitrile, said mixture containing at least 20 weight percent of the copolymer, despositing the mixture on a support, gelling the mixture whereby a wet-gel film is formed, drying vulcanizing said wet-gel film and stripping the vulcanized film off the support.

13. The process according to claim 12 in which the aqueous dispersion of the copolymer is mixed with the dispersions of 1–5 parts of zinc oxide, 0.25–2.5 parts of sulfur, and 0.1–2.5 parts of a vulcanization accelerator, all parts based on 100 parts of the dispersed copolymer.

14. The process according to claim 13 in which the mixture while deposited on the support is dipped in a liquid coagulant medium whereby a wet-gel film is formed.

15. An oil resistant elastic film of a vulcanized composition comprising 100 parts of a rubbery copolymer of 55–80 mole percent of 2-alkyl butadiene-1,3 containing 1–5 carbon atoms in the alkyl substituent and 45–20 mole percent of acrylonitrile, 1–10 parts of zinc oxide, 0.25–5.0 parts of sulfur, and 0.1–2.5 parts of a vulcanization accelerator, said composition being free of reinforcing filler and having a tensile strength of at least 130 kg./cm.$^2$ and an ultimate elongation of at least 500 percent.

16. The elastic film according to claim 15 in which the 2-alkyl butadiene-1,3 is isoprene.

17. An oil resistant elastic thread of a vulcanized composition comprising 100 parts of a rubbery copolymer of 55–80 mole percent of 2 alkyl butadiene-1,3 containing 1–5 carbon atoms in the alkyl substituent and 45–20 mole percent of acrylonitrile, 1–10 parts of zinc oxide, 0.25–5.0 parts of sulfur, and 0.1–2.5 parts of a vulcanization accelerator, said composition being free of reinforcing filler and having a tensile strength of at least 130 kg./cm.$^2$ and an ultimate elongation of at least 500 percent.

18. The elastic thread according to claim 17 in which the composition also contains 5–20 parts of a non-reinforcing filler.

19. The elastic thread according to claim 18 in which the non-reinforcing filler is selected from the group consisting of aluminum silicate, barium sulfate, calcium carbonate and magnesium silicate.

20. The elastic thread according to claim 19 in which the 2-alkyl butadiene-1,3 is isoprene.

References Cited

UNITED STATES PATENTS

| 2,885,381 | 5/1959 | Svetlik. |
| 3,284,396 | 11/1966 | Talalay _____ 260—29.7 |

FOREIGN PATENTS

| 539,904 | 4/1957 | Canada. |
| 957,652 | 5/1964 | Great Britain. |

ALLAN LIEBERMAN, Primary Examiner

U.S. Cl. X.R.
260—79.5, 82.3, 83.5